United States Patent
Sipma et al.

(10) Patent No.: US 7,841,271 B2
(45) Date of Patent: *Nov. 30, 2010

(54) CHEESE VAT FOR PREPARING SOFT FRESH CHEESE, AND CUTTING FRAME FOR A CHEESE VAT

(75) Inventors: Sijmen Sipma, De Knipe (NL); Wieger van der Meulen, Damwoude (NL)

(73) Assignee: Tetra Laval Holdings & Finance S.A., Pully (CH)

( * ) Notice: Subject to any disclaimer, the term of this patent is extended or adjusted under 35 U.S.C. 154(b) by 420 days.

This patent is subject to a terminal disclaimer.

(21) Appl. No.: 11/858,188

(22) Filed: Sep. 20, 2007

(65) Prior Publication Data

US 2008/0047442 A1 Feb. 28, 2008

Related U.S. Application Data

(63) Continuation of application No. 10/728,792, filed on Dec. 8, 2003, now Pat. No. 7,305,917.

(30) Foreign Application Priority Data

Dec. 10, 2002 (NL) .................................... 1022127

(51) Int. Cl.
*B26D 1/553* (2006.01)
(52) U.S. Cl. .............................. 99/461; 99/466; 99/452; 83/651.1; 83/581.1; 366/326.6; 366/325.94
(58) Field of Classification Search .................. 99/461, 99/462, 463, 460, 466, 452, 459; 83/651.1, 83/581.1, 569; 366/325.6, 325.94; 30/117
See application file for complete search history.

(56) References Cited

U.S. PATENT DOCUMENTS

| 805,602 | A | * | 11/1905 | Waters | 83/425.1 |
| 893,591 | A | * | 7/1908 | Larsen | 83/624 |
| 1,695,761 | A | * | 12/1928 | Hecker | 30/303 |
| 2,023,706 | A | | 12/1935 | Smith | |
| 2,083,429 | A | * | 6/1937 | Castriana | 83/662 |
| 2,114,277 | A | | 4/1938 | Bloomfield | |
| 2,663,081 | A | | 12/1953 | Hensgen | |
| 3,096,582 | A | | 7/1963 | Mueller | |
| 3,245,361 | A | | 4/1966 | Enoch et al. | |
| 4,125,047 | A | | 11/1978 | Martin | |
| 4,137,807 | A | * | 2/1979 | Schaumberg | 83/599 |
| 4,646,602 | A | | 3/1987 | Bleick | |
| 5,052,290 | A | | 10/1991 | Nielsen | |
| 5,207,137 | A | | 5/1993 | Baril | |
| 5,462,355 | A | | 10/1995 | Yowell | |

FOREIGN PATENT DOCUMENTS

| GB | 2032330 A | 5/1980 |
| NL | 1 137 253 | 9/1962 |
| WO | WO 2004/043656 A1 | 5/2004 |

* cited by examiner

*Primary Examiner*—Reginald L Alexander
(74) *Attorney, Agent, or Firm*—Quarles & Brady LLP (57) ABSTRACT

A cheese vat for at least preparing curd for soft fresh cheese, comprising at least one cutting frame provided with a cutting wire system, which has a frame which has at least two opposite frame parts between which cutting wire sections extend, which frame parts are provided with openings form receiving a cutting wire, wherein the ends of a cutting wire are each fastened via pull relief means.

14 Claims, 6 Drawing Sheets

CHEESE VAT FOR PREPARING SOFT FRESH CHEESE, AND CUTTING FRAME FOR A CHEESE VAT

CROSS REFERENCES TO RELATED APPLICATIONS

This application is a continuation application of application Ser. No. 10/728,792, now U.S. Pat. No. 7,305,917 filed on Dec. 8, 2003 which claims the priority benefit of Netherlands Patent Application No. 1022127 filed on Dec. 10, 2002.

The invention relates to a (cheese vat for at least preparing curd for soft fresh cheese of the type that is usually designated as, for instance, soft curd cheese, cream cheese, cottage cheese or "Hüttenkäse", comprising at least one cutting frame provided with a cutting wire system, which has a frame having at least two opposite frame parts between which cutting wire sections extend, which frame parts are provided with openings for receiving a cutting wire.

Such an apparatus usually comprises an elongated horizontal tank, to which, in operation, skimmed milk is supplied. In the tank, means are present for stirring the milk and stirring and cutting the curd formed in the tank after adding rennet respectively. Examples of apparatuses for preparing cottage cheese and the like are described in EP-A-0398836 and FR-A-2623056. Further, applicant's Tetra Tebel O-vat is known from practice. The Tetra Tebel O-vat is a closed curd preparation apparatus for cottage cheese curd or cottage cheese. For cutting the curd, use is made of cutting wires of rustproof steel. The cutting wires are tensioned on the cutting frames, which are arranged for radially and longitudinally cutting the curd in the tank. A suitable wire diameter is, for instance, 0.5 mm and the wires of a cutting frame are usually 8 to 12 mm spaced apart. Usually, one of the cutting frames is provided with two sets of cutting wires extending crosswise. Normally, this holds true for the cutting frame which cuts the curd in a longitudinal direction. For this purpose, the respective cutting frame is provided with a set of horizontal and a set of vertical cutting wires. In rest, this cutting frame is in a vertical position at one of the ends of the tank, and, at the moment that a longitudinal cutting operation is needed, it is moved through the curd from one end of the tank to the other end of the tank. Thus, the curd is cut into elongated horizontal bars. Through the operation of the radial cutting frame, which comprises a large number of parallel cutting wires and which can rotate about a horizontal axis extending above the curd level, the bars are cut into cubes. The cutting operations serve to promote the draining of whey. The stirring means are arranged to carefully stir the milk and the whey-curd mixture respectively.

In the preparation of cottage cheese or the like, the curd is heated and is washed with water a number of times, and cream is added. All these steps can be carried out in one and the same tank, which then directly provides the final product. However, it is also possible to use separate apparatuses for specific steps of the cheese production process, following the apparatus in which the curd is formed and cut. The invention relates to a cheese vat in which curd for cottage cheese or similar cheese is at least cut using cutting frames, irrespective of whether other steps of the cheese production process also take place in the cheese vat. It is also possible for the whole cheese production process to take place in the cheese vat. In that case, the invention is also applicable.

A problem of the known cheese vats for the production of (curd for) cottage cheese or the like is the attachment of the cutting wires. Usually, the wires are run through openings in the frame parts of the cutting frame or through eyes or the like and the free ends of the neighboring wires or a wire loop formed by the cutting wire are twisted together on the outside of the frame to fix the cutting wires and tension them and keep them tensioned. Also, sometimes, wire ends are tied together, whether or not followed by twisting together.

However, such tied and/or twisted wires are difficult to clean as a consequence of the gaps and cavities arising between the twisted wire sections. This problem can at least partly be solved by filling the gaps and cavities of the twisted wire sections with silver solder. A drawback of this solution is that, generally, repair of a broken cutting wire cannot take place in the cheese factory. Another drawback is that silver solder disappears in time because it dissolves in the cleaning agents used.

Usually, relatively short wires are used, which extend from a first frame part to a second frame part located opposite the first frame part and back again to the first frame part. The free ends of neighboring wires are interconnected on the outside of the first frame part, for instance by twisting the ends together. An advantage of this construction is that, in the case of wire breakage, only a short piece of cutting wire needs to be replaced. A drawback, however, is that a large number of wire connections need to be made. Here, also, the associated problems with regard to cleaning arise.

It is an object of the invention to obviate the problem described and, in general, to provide a simply and effectively cleanable cheese vat comprising at least one cutting frame provided with cutting wires. For this purpose, according to the invention, a cheese vat of the above-described type is characterized in that the ends of a cutting wire are each fastened via pull relief means.

In the following, the invention will be described in more detail with reference to the appended drawing of a few exemplary embodiments.

Figure 1:
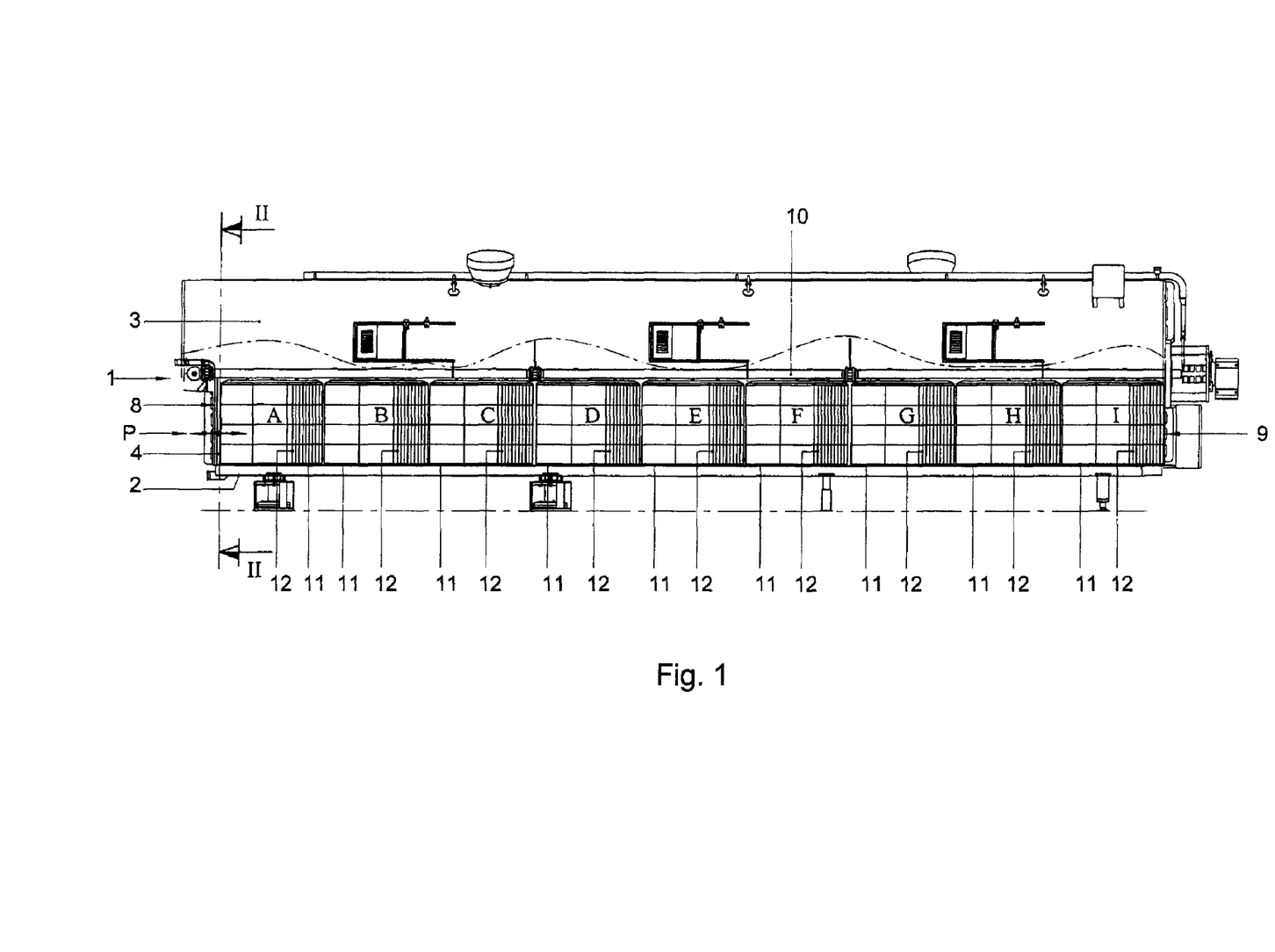
FIG. 1 diagrammatically shows a partly cutaway side elevational view of a cheese vat for preparing curd for soft fresh cheese.
Figure 2:
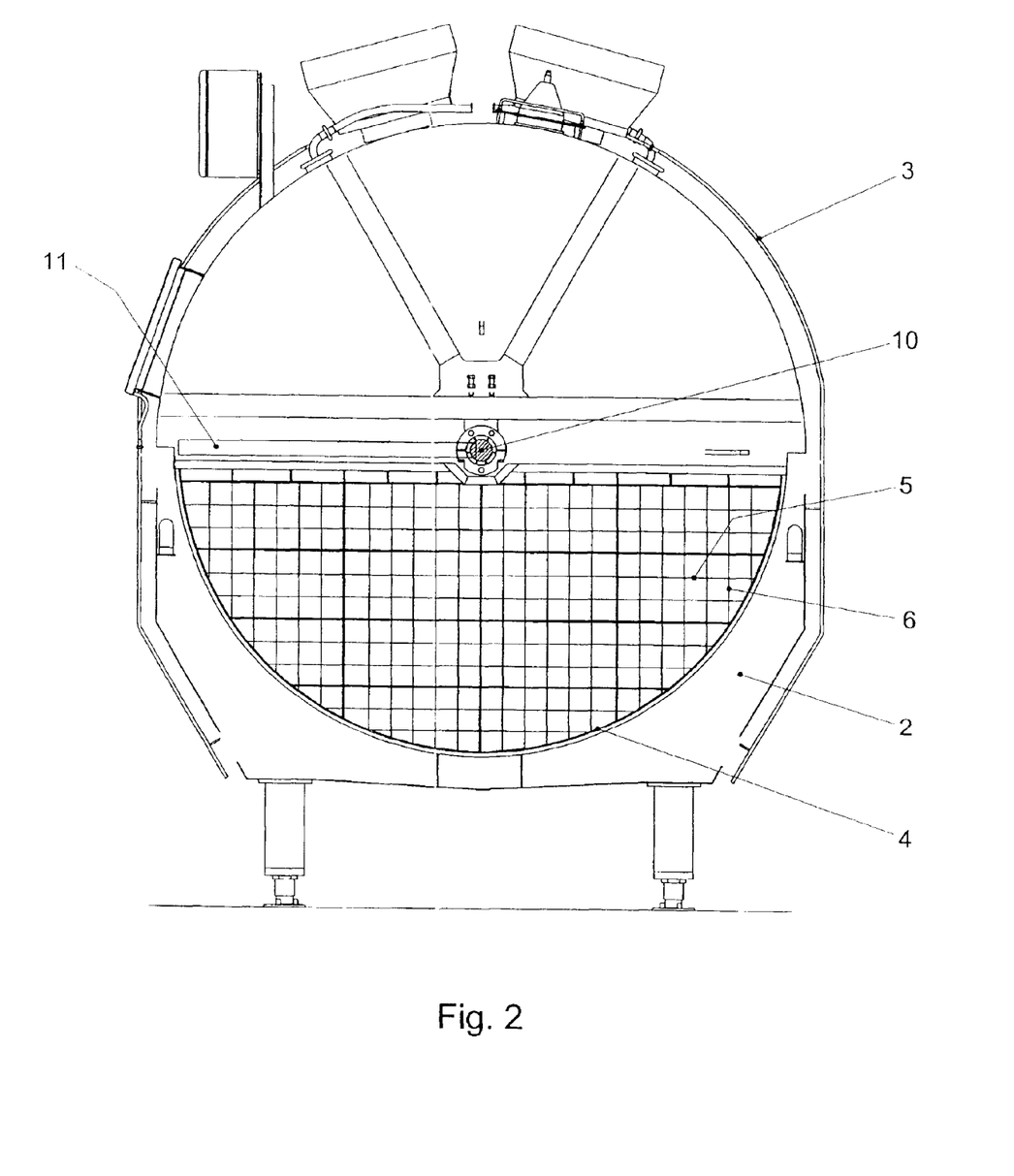
FIG. 2 diagrammatically shows a cross section along the line II-II in FIG. 1.

FIG. 1 diagrammatically shows a partly cutaway side elevational view of a cheese vat 1 for preparing soft cheese, or curd for soft cheese. The cheese vat shown has a lower part 2 having an elongated bathtub-like shape, and a superstructure 3 placed on the lower part. In the lower part, the curd preparation takes place. The upper part closes off the cheese vat and is provided with manholes, optionally a CIP (cleaning-in-place) system, etc. Situated in the lower part, is a first cutting frame 4 movable in a longitudinal direction (arrow P), which, as can be seen in FIG. 2, in this example, is provided with both a horizontal and a vertical wire stringing 5 and 6 respectively. The cutting frame 4 is movable from one end wall 8 to the other end wall 9 and back. For this purpose, driving means known per se, but not further shown, are present.

Further, a horizontal central longitudinal axis 10 extends in the longitudinal direction over the lower part, which axis carries a second cutting frame 11. The second cutting frame 11 has a position of rest in which it is located above the curd surface, and can be rotated downwards from that position of rest to a vertical position directed downwards (as shown in FIG. 1), and then upwards again to a position located above the curd surface, in order to cut the curd present in the cheese vat. In the example shown, the rotatable cutting frame has a number of sections A to I. In this example, the rotatable cutting frame has a wire stringing with wires 12 extending transversely to the horizontal axis 10. The cutting frames are usually manufactured from rustproof steel.

In the known cheese vats the cutting wires of a cutting frame are formed by relatively short wires, which are run through openings in opposite frame parts of the cutting frame. Each wire thus comprises a small number of wire sections, for instance 1 to 2, between the opposite frame parts.

The wires are connected to neighboring wires by twisting and/or tying the ends together or the like and then optionally securing them by soldering.

According to one aspect of the invention, relatively long wires are used, each comprising a large number of wire sections between two opposite frame parts. An example would be wires with, for instance, 25 to 35 sections. It is possible to use more sections or, conversely, fewer sections. The ends of a wire can be connected to a preceding and a following wire, but, preferably, the two ends of a wire are connected to a neighboring frame part or to each other.

Figure 3:
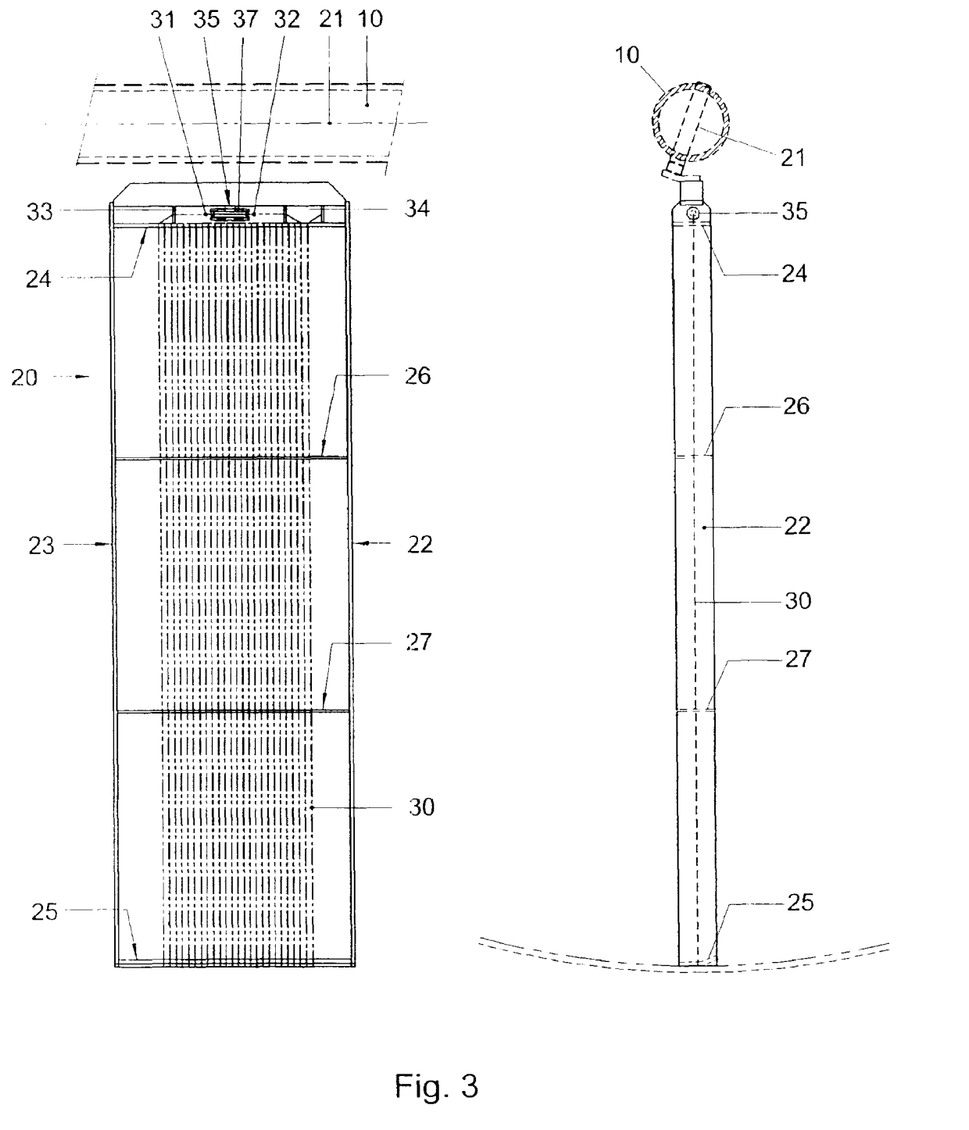
FIG. 3 diagrammatically shows a view of a cutting frame section for a cheese vat of the type shown in FIG. 1 and FIG. 2 provided with an example of a wire-connecting apparatus according to the invention.

An example of the latter method is diagrammatically shown in FIG. 3. FIG. 3 shows a view of a cutting frame section 20, used as a test section, for a rotatable cutting frame for a curd preparation vat. The frame of the cutting frame section shown comprises two parallel side strips 22,23 extending transversely to the rotation axis 21 of the cutting frame. Near the end of the cutting frame section proximal to the rotation axis and at the end of the cutting frame section remote from the rotation axis, each time, a cross connection element, for instance a cross strip or cross beam 24,25 has been provided. Further, in the example shown, intermediate strip-shaped cross connection elements 26,27 have been used. In a practical embodiment, the side strips can, for instance, have a length of the order of, for instance, 1 m, and the cross strips can have a length of the order of, for instance, 1.25 m. The frame parts are designed as a curd-cutting knife operative in at least one direction.

The cutting wire sections extend between the inner cross strip 24 and the outer cross strip 25 of the frame of the cutting frame. For this purpose, openings are provided in the cross strips, for instance a number of throughbores located next to one another. In the example shown, the cross strips 24 and 25 each have twenty-five bores. The single cutting wire 30 is woven through the openings of the cross strips 24 and 25 from the top left in the drawing to the top right, so that, eventually, in this example, also, twenty-five wire sections located next to one another extend between the cross strips 24 and 25. It is noted that, unlike in the test section shown, in a practical embodiment, the cutting wires take up the whole area between the side strips. Further, the distance between the cross strips can be adjustable by adjusting means, so that the tension of the cutting wires is adjustable. The two ends 31 and 32 of the cutting wire 30 have been led through the two outer lead-through openings in the cross strip 24 and are located beyond the inner cross strip 24, i.e. on the side of the cross strip 24 facing away from the other cross strip 25. In this example, further, the ends 31 and 32 have each been led over a spacer 33, 34, which have been provided on the side of the inner cross strip 24 facing the rotation axis and are, in this example, interconnected between the spacers by a connecting element 35. Like the (edges of the) lead-through openings, the spacers act as pull reliefs. The pull-relief action can be increased by wrapping the cutting wire partly, or even a number of times, around a suitable part of the spacer or around a separate pull relief.

Figure 9:
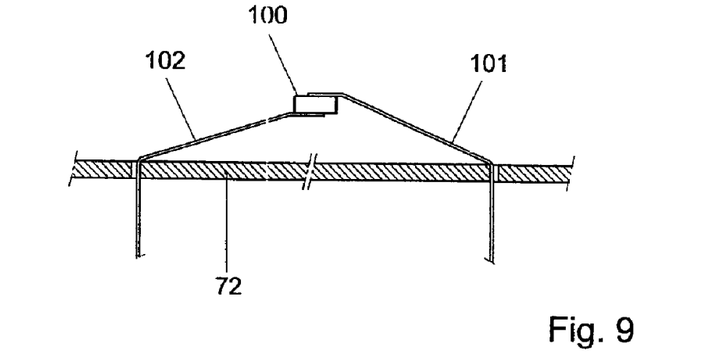
FIG. 9 diagrammatically shows a variant of FIG. 3.

The connecting element 35, which connects the wire ends in the manner of a kind of necklace, is not shown in detail, but can, for instance, comprise a central tubular body 37, which is provided, on both ends, with, for instance, screw thread, a clamp fastener, or a bayonet catch or the like for cooperation with suitable locking caps. The locking caps can each be provided with an end plate, which at least partly consists of a material pierceable by a cutting wire or a needle or the like. For each locking cap, as an end plate, for instance, a disc can be used from a material having such properties that a cutting wire can be run through the disc through an optionally preformed opening, while preserving the sealing action of the locking cap. The disc can be manufactured from, for instance, rubber or a suitable synthetic material. However, the connecting element can also consist of a floating block of rustproof steel 100, on which the cutting wire ends 101, 102 have been welded down (FIG. 9).

The ends 31 and 32 of a cutting wire reach into the interior part of the tubular body 37 and are interconnected there in a manner not further shown, for instance by tying and/or twisting together and/or soldering etc. Since the interior part of the connecting element is completely closed off in the operative condition shown, the wire connection cannot become polluted and neither can a possibly used soldering material dissolve in the cleaning fluid.

Figure 4:
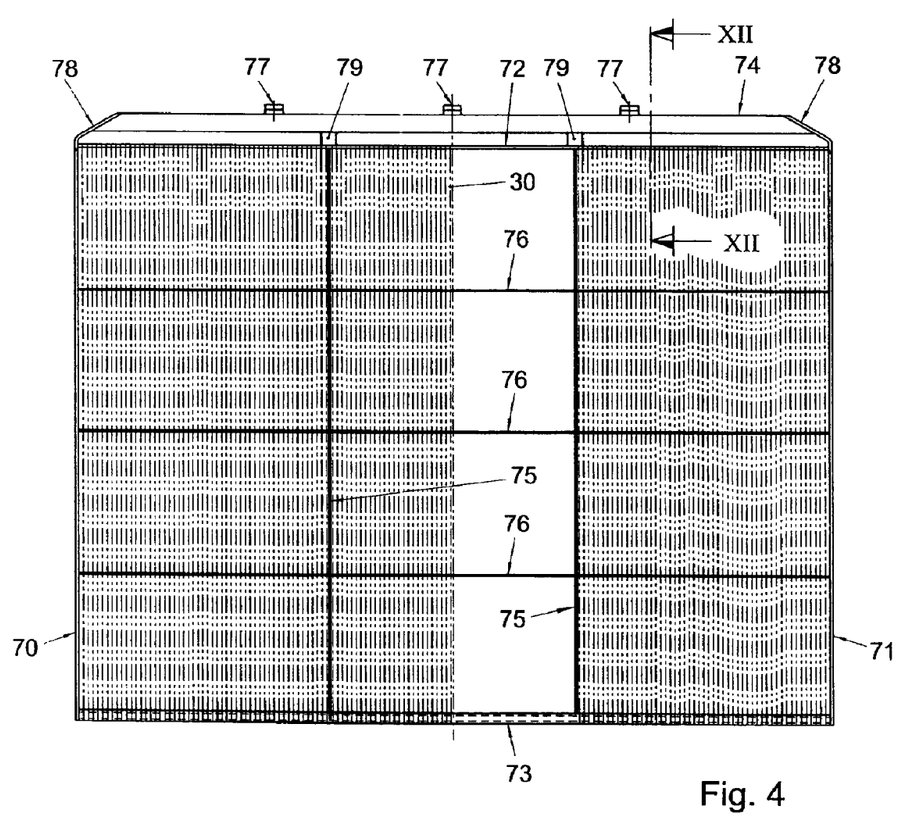
FIG. 4 and FIG. 5 diagrammatically show, in front and top plan view, an example of a cutting frame section according to the invention.
Figure 5:
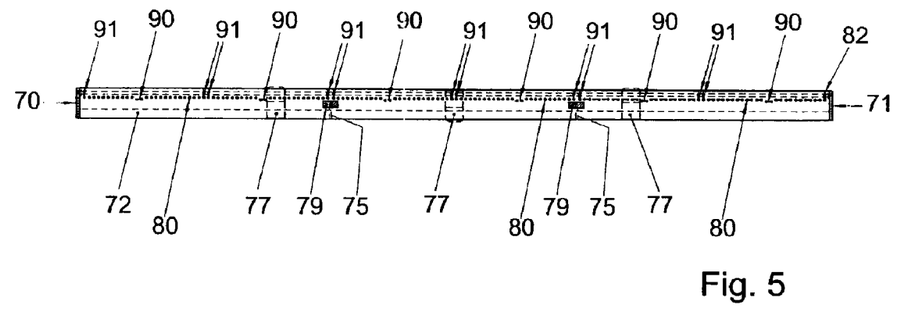

FIG. 4 and FIG. 5 diagrammatically show, in front view and in side elevational view, an example of a section for a cutting frame for a cheese vat according to the invention. In FIG. 4, a part of the cutting wire stringing has been omitted. Like the cutting frame section of FIG. 3, the cutting frame section shown comprises a frame with two side strips 70, 71, an inner and an outer cross strip 72, 73, a girder 74 and a number of intermediate radial strips 75 as well as a number of intermediate cross strips 76. The frame parts are again designed as a curd-cutting knife operative in at least one direction of movement.

The girder 74 is provided with attachment lips 77 for attaching the cutting frame section to a central driving shaft. Further, in this example, the girder is connected to the rest of the cutting frame section via bent ends 78 of the side strips and via a number of intermediate pieces 79.

In the example shown, the cutting frame section is provided with six long wires, which each comprise a large number of wire sections, in this example 26. In this example, the free ends of the wires are always on the inner cross strip 72, which, like the outer cross strip and the intermediate cross strips, is provided with run-through openings for the cutting wires. In FIG. 5, the run-through openings in the inner cross strip are generally designated by 80.

In this example, the free ends of a cutting wire are not attached to each other or to the corresponding ends of neighboring wires, but are led via pull relief, i.e. tension-reducing, means and are attached to the inner cross strip itself by welding. Pull relief can be obtained by wrapping the cutting wire around, for instance, a rod-shaped element, which may or may not be part of a spacer. Instead of directly to the inner cross strip, the wire could also be welded to the spacer or pull relief itself, as diagrammatically shown in FIGS. 6 and 7.

Figure 6:
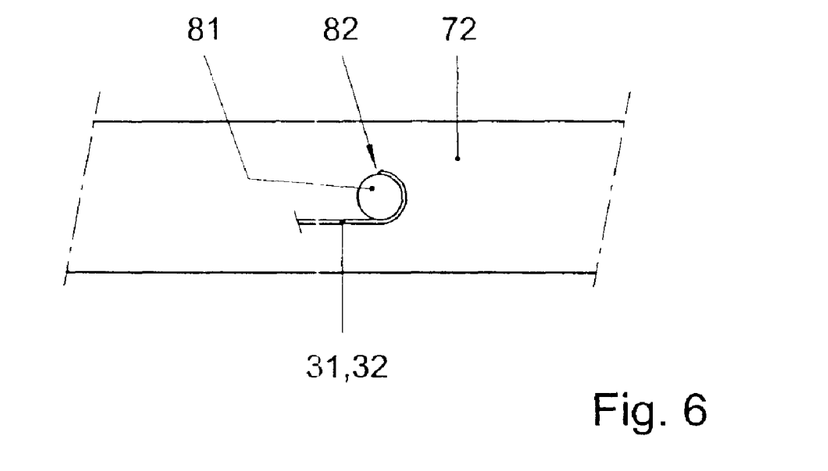
FIG. 6 diagrammatically shows an example of a pull relief element for use in an apparatus according to the invention.

FIG. 6 shows, in top plan view, a rod-shaped pull relief 81 provided on a frame strip 72. A cutting wire end is partly wrapped around the rod 81 and welded down on the rod by the free end at 82.

Figure 7:
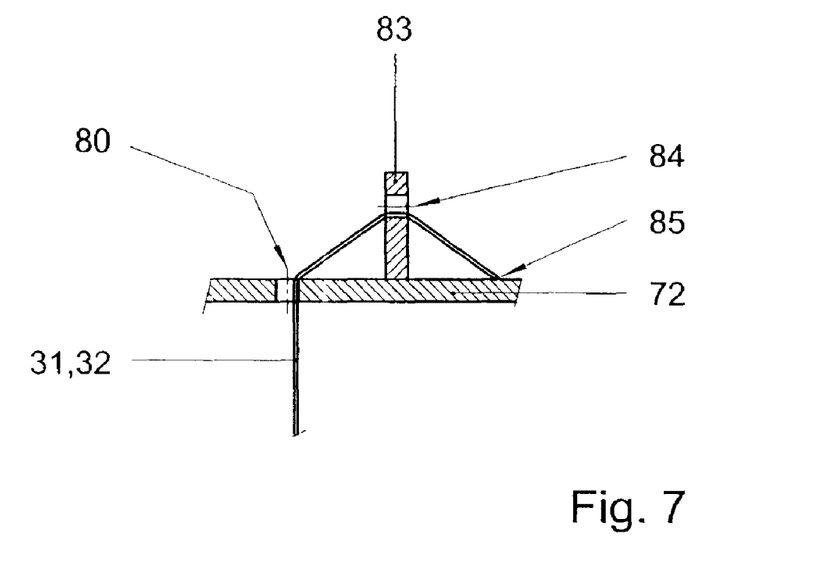
FIG. 7 diagrammatically shows another example of a pull relief element.

FIG. 7 shows a frame strip 72 in longitudinal cross section with a pull relief 83 on it, which also serves as a spacer. In this example, an opening 84 has been provided in the plate-shaped pull relief, through which an end 31, 32 of a cutting wire has been led. The free end of the cutting wire has been welded down on the strip at 85. With the attachment method used in the example of FIG. 4 and FIG. 5, no separate spacer has been used. In this example, the pull relief, which is desirable because the cutting wire may lose strength near the weld due to the welding process, has been obtained by leading a cutting wire end to be fastened through two extra openings in the inner frame strip 72 and only welding it down beyond those openings.

Figure 8:
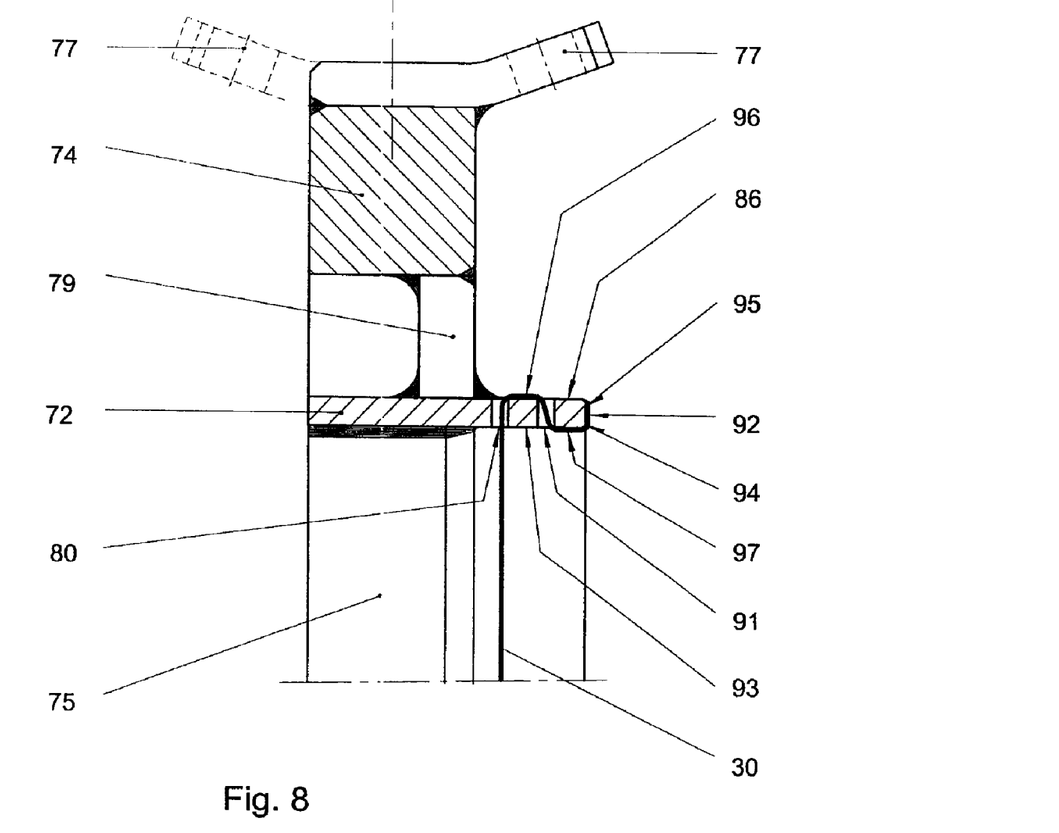
FIG. 8 diagrammatically shows a cross section along the line IV-IV in FIG. 4.

This attachment method is diagrammatically shown in more detail in FIG. 8. FIG. 8 shows a part of a cutting frame section located near the central rotation axis. As already described hereinabove, via intermediate pieces 79, the inner cross strip is connected to a girder 74, which in turn is provided with attachment lips 77. The strip 72 has openings 80 located next to one another in a long row in the manner shown in FIG. 5. In the example shown, in each series of openings located between two connection sites of a cutting wire, each time, two slightly staggered openings have been provided, as shown at 90 in FIG. 5. These staggered openings indicate the middle of a cutting wire and form an aid for providing the cutting wire. Further, at a distance from the staggered openings, at the location of the ends of a cutting wire, extra openings 91 have been provided, which are each located next to a regular opening 80. The openings 91 are indicated in FIG. 5 and one opening 91 is shown in FIG. 8. As shown in FIG. 8, in this example, the opening 91 is, for instance, located between the narrow edge surface 92 of the strip 72 and a regular opening 80. The end of a cutting wire 30, coming from the outer cross strip 73, has been led through the opening 80 shown and has then been run from the top surface 86 of the strip 72 through the opening 91. The cutting wire end thus led through the opening 91 and pointing downwards (in the orientation of FIG. 8) has, in this example, subsequently been bent along the bottom side 93 of the strip and pointing to the edge surface 92. Finally, in this example, the cutting wire end has further been bent around the edge 94 between the bottom surface 93 and the narrow edge surface 92 and welded down on the narrow edge surface 92 at 95. The edges of the openings 80 and 91 and the edge 94 act as pull relief so that the pulling force which is, in operation, exerted on the weld and on the cutting wire end connected to the weld is reduced.

Further, the wire sections 96, 97 located between the openings 80 and 91 and between the opening 91 and the edge 94 respectively do not lie flat on the strip surfaces 86 and 93, because the cutting wire has the natural tendency to bulge slightly between two successive edges. The interspace thus obtained between the strip surface and the cutting wire is rinsable with a suitable cleaning agent, allowing an effective cleaning of the mounted cutting frame.

It is noted that, alternatively, the cutting wire could also be welded down on the bottom surface 93 or the top surface 86 of the strip 72. Also, the wire could be led through more than two openings before it is welded down, or, conversely, through one opening only. The number of edges around which the wire has been bent before it is welded down is related to the degree of pull relief occurring. As already indicated hereinabove, the edges can be both edges of openings and edges (such as 94) of the strip. In FIG. 7, these are actually edges of a special pull relief element 83.

In the situation of FIG. 8, if a relatively small degree of pull relief is needed, after being run through the opening 80, the cutting wire could, for instance, be bent around the narrow edge surface 92 of the strip 72 to be welded down on the bottom side of the strip 72. Several variants are readily apparent to a person skilled in the art.

The welding preferably takes place without addition of extra welding material.

In general, according to the invention, the desired pull relief action is obtained by having a cutting wire end undergo a change of direction of the order of approximately 90° or more between the last cutting section and the site where the end of the cutting wire is fastened. Here, the change of direction can comprise multiple steps of approximately 90° (FIG. 8) or of less than approximately 90° (FIGS. 3, 6, 7). By using pull relief means for the cutting wires of a cheese vat as described hereinabove, the chance of wire breakage near the attachment site of the wires is reduced. Also, the connection of a cutting wire end with another cutting wire end or with the frame of a cutting frame or the like is less loaded, resulting in more freedom of choice for the manner of attachment.

It is noted that, in principle, the manners described of fastening the cutting wires are also applicable if much shorter cutting wires are used, which comprise only a small number of cutting wire sections.

It is further noted that, after the foregoing, various modifications are readily apparent to a person skilled in the art. In particular, for the length of the cutting wire and for the pull relief means, many variants are conceivable without departing from the scope of the inventive concept. The length of a cutting wire is preferably such that a cutting wire comprises five or more, preferably 10 or more, and more preferably between 20 and 30 cutting sections.

The invention claimed is:

1. A cutting frame for a cheese vat for at least preparing curd for soft fresh cheese, which cutting frame comprises a cutting wire system, and has a frame having at least two opposite frame parts between which cutting wire sections extend, which frame parts are provided with openings for receiving a cutting wire, wherein the ends of a cutting wire are each fastened via pull relief means, wherein said pull relief means includes structure engaging said cutting wire and forming a sharp transition in said cutting wire between one end of said cutting wire and an adjacent cutting wire section, wherein the ends of a cutting wire are interconnected by means of a wire-connecting element.

2. A cutting frame according to claim 1, wherein the length of said cutting wire is great compared to the length of a cutting wire section.

3. A cutting frame according to claim 2, wherein said cutting wire comprises at least five cutting wire sections.

4. A cutting frame according to claim 3, wherein a cutting wire comprises between 20 and 30 cutting wire sections.

5. A cutting frame according to claim 1, wherein the sharp transition is formed by passing said cutting wire over at least one edge of at least one opening in a frame part.

6. A cutting frame according to claim 1, wherein the pull relief means comprise an opening in a pull relief element provided on the frame.

7. A cutting frame according to claim 1, wherein the pull relief means comprise a rod-shaped element, which is attached to the frame, wherein a cutting wire end has been wrapped over at least a part of the circumference of the rod-shaped element to form the sharp transition in the cutting wire.

8. A cutting frame according to claim 1, wherein the wire-connecting element comprises a closable housing, inside which the cutting wire ends have been fastened.

9. A cutting frame according to claim 1, wherein the wire-connecting element comprises a floating block of rustproof steel on which the cutting wire ends have been fastened.

10. A cutting frame according claim 1, wherein a cutting wire end shows a change of direction of the order of approximately 90° or more between the neighboring cutting section of the respective cutting wire and the site where the cutting wire end has been fastened.

11. A cheese vat for at least preparing curd for soft fresh cheese comprising at least one cutting frame according to claim 1.

12. A cutting frame for a cheese vat for at least preparing curd for soft fresh cheese, which cutting frame comprises a cutting wire system, and has a frame having at least two opposite frame parts between which cutting wire sections extend, which frame parts are provided with openings for receiving a cutting wire, wherein the ends of a cutting wire are each fastened via pull relief means, wherein said pull relief means includes structure engaging said cutting wire and forming a sharp transition in said cutting wire between one end of said cutting wire and an adjacent cutting wire section, wherein the cutting wire ends have been fastened by welding.

13. A cutting frame for a cheese vat for at least preparing curd for soft fresh cheese, which cutting frame comprises a cutting wire system, and has a frame having at least two opposite frame parts between which cutting wire sections extend, which frame parts are provided with openings for receiving a cutting wire, wherein the ends of a cutting wire are each fastened via pull relief means, wherein said pull relief means includes structure engaging said cutting wire and forming a sharp transition in said cutting wire between one end of said cutting wire and an adjacent cutting wire section, wherein the opposite frame parts are provided with a number of series of openings located next to one another in a row for receiving a cutting wire, wherein the pull relief means have been provided on at least one of the frame parts, and the corresponding cutting wire ends have been led through the pull relief means, wherein the cutting wire ends have been welded down on the respective frame part beyond the pull relief means.

14. A cutting frame according to claim 13, wherein the sharp transition is formed by passing said cutting wire over at least one edge of the frame part.

* * * * *